April 2, 1968 RYOJI NAKANISHI ET AL 3,376,257
FULLY AROMATIC POLYBENZOXAZOLES AND PROCESS
FOR THEIR PREPARATION
Filed June 11, 1964 2 Sheets-Sheet 1

INFRARED SPECTRUM — POLY(3,3'-DIHYDROXY-4,4'-DIACETAMIDODIPHENYL-ISOPHTHALIC ACID ESTER)

INFRARED SPECTRUM — POLY-2,2'-(M-PHENYLENE)-6,6'-BIBENZOXAZOLE

INFRARED SPECTRUM — 3,3'-DIHYDROXY-4,4' DIACETAMIDODIPHENYL

3,376,257
FULLY AROMATIC POLYBENZOXAZOLES AND PROCESS FOR THEIR PREPARATION

Ryoji Nakanishi and Takashi Kubota, Kanagawa-ken, Japan, assignors to Toyo Rayon Kabushiki Kaisha, Tokyo, Japan, a corporation of Japan
Filed June 11, 1964, Ser. No. 374,391
Claims priority, application Japan, June 14, 1963, 38/30,508; Feb. 17, 1964, 39/8,132
13 Claims. (Cl. 260—47)

ABSTRACT OF THE DISCLOSURE

A process for the preparation of aromatic polybenzoxazoles which comprises reacting (a) a diamino-dihydroxy-diphenyl compound having an acyl group as an amino-protecting group with (b) an aromatic dicarboxylic acid derivative to form a polyester and thereafter heating the polyester to deacylate the same and form the polybenzoxazole.

---

This invention concerns novel condensation polymers and a process for their preparation. More particularly, this invention relates to novel linear fully aromatic polybenzoxazoles and their preparation.

As the polymers having benzoxazole rings in the main polymer chain, there have already been known polybenzoxazoles with aliphatic linkages in the chain by United States Patent No. 2,904,537. In general, such polybenzoxazoles have high resistance to light, a high melting point, low water adsorption and high crystallinity.

However, such known polybenzoxazoles are derived on the basis of a reaction to form a benzoxazole ring directly by a poly-condensation product of aminohydroxyphenyl compounds with alkanoic acids or a poly-condensation product of bis-hydroxyaminophenyl compounds with aliphatic dicarboxylic acids.

In the case of employing a process in which polymerization is effected while forming benzoxazole rings directly, only some limited aliphatic compounds can be used as a carboxylic acid component. The reason is that when condensation is effected by using a carboxylic acid component other than the specified aliphatic compounds, the obtained substance has a very low polymerization degree and poor commercial value as the pre-polymers are insoluble as well as infusible.

On the other hand, it is true that polybenzoxazoles with aliphatic linkages in the chain which are obtained at comparatively high polymerization degree may have a high melting point as compared with the ordinary polymers, but the highest one can expect is around 300° C. Also, the water-resistance of a benzoxazole having an aliphatic radical is not as sufficiently high, as anticipated.

This invention provides high molecular weight polybenzoxazoles having excellent physical properties and which may be put to many more uses than the known polybenzoxazoles.

Accordingly, one object of this invention is to provide novel organic polymer materials which are completely infusible at high temperatures, have good thermal stability and therefore can find many applications, and a process for their preparation.

Another object of this invention is to impart far more excellent thermal stability and resistance to chemicals to an article shaped from a polymer having good shaping-ability.

The fully aromatic polybenzoxazoles consist of at least one of the recurring units of the general formula:

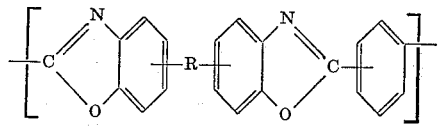

or

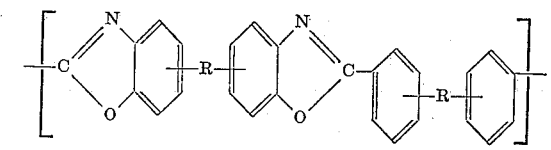

(wherein R represents a direct carbon-to-carbon bond between the two aromatic rings, a divalent hydrocarbon radical having 1 to 3 carbon atoms, or a divalent radical selected from the group consisting of —S— radical,

radical and —O— radical; these radicals may be the same or different), and have an inherent viscosity of 0.3 to 2.0 determined in concentrated sulphuric acid at 30° C.

Particularly preferable among the said recurring units are those of the general formula:

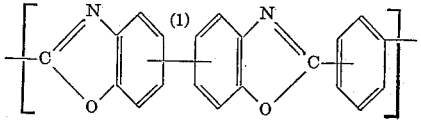

(wherein the carbon-to-carbon direct bond (1) between the 2 aromatic rings takes the para-position to one of the N—C and O—C bonds which are attached to the phenyl radical).

The fully aromatic polybenzoxazoles are the polymers consisting substantially of the said recurring units, but other radicals, preferably an aromatic radical, may be included at the end of the molecular chain or in the main chain.

The polymerization degree of the fully aromatic polybenzoxazoles is in the range of 0.3 to 2.0 determined in terms of an inherent viscosity in concentrated sulphuric acid at 30° C.

The term "inherent viscosity" or "$\eta_{inh}$" as used herein is defined by the following equation:

$$\eta_{inh.} = \frac{\ln \eta_{rel.}}{C}$$

wherein ln represents natural logarithm, C is the concentration of the solute in grams per 100 cc. of solvent, and $\eta_{rel.}$ is the relative viscosity of a diluted polymer solution (10% or less) which is ordinarily determined at a concentration of 0.5 g. of polymer per 100 cc. of concentrated sulphuric acid.

The said polybenzoxazoles are obtained by deacylation of a polyester having a recurring unit represented by the general formula:

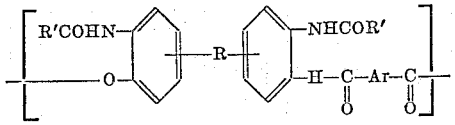

(wherein —Ar— is an aromatic divalent radical selected from the group consisting of

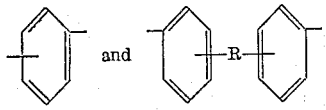

R' is a monovalent radical selected from the group consisting of hydrogen atom, alkyl radical, aryl radical and arylalkyl radical, and R is a divalent radical as hereinabove defined).

The fully aromatic polybenzoxales of this invention are infusible and also insoluble in ordinary solvents except concentrated sulphuric acid. On the other hand, as the said polyester is fusible and solvent-soluble, it is easy to obtain a polymer of high polymerization degree as mentioned above.

Furthermore, since the said polyester has good moldability, it is possible to obtain shaped articles of the fully aromatic polybenzoxazoles of this invention by deacylating shaped articles of the said polyester.

It is also possible to form composite articles of the fully aromatic polybenzoxazoles of this invention with other articles by applying the said polyester to other articles by means of coating, etc. and thereafter deacylating it, and thereby to impart resistance to heat and chemicals to these articles.

A process for preparing the said fully aromatic polybenzoxazoles of this invention comprises reacting (a) a diamido-dihydroxy-diphenyl compound of the general formula:

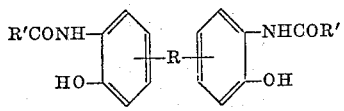

(wherein R' is a monovalent radical selected from the group consisting of hydrogen atom, alkyl radical, aryl radical and arylalkyl radical, R is a direct carbon-to-carbon bond between the two aromatic rings, a divalent hydrocarbon radical having 1 to 3 carbon atoms, and a divalent radical selected from the group consisting of —S— radical,

radical and —O— radical) with (b) an aromatic dicarboxylic acid compound selected from the group consisting of the compounds represented by the general formula:

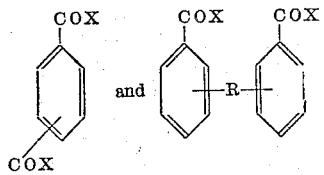

(wherein X is a monovalent radical selected from the group consisting of a hydroxy radical, —OR" radical, —OCOR" radical, an amino radical and a halogen atom, R" being a monovalent radical selected from the group consisting of an aliphatic and an aromatic hydrocarbon radical, and R is a divalent radical as defined in (a) above) at a temperature below that at which deacylation takes place to form a polyester having a recurring unit of the general formula:

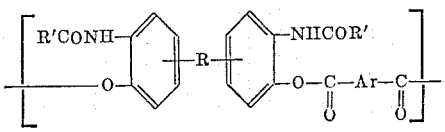

wherein —Ar— is an aromatic divalent radical selected from the group consisting of

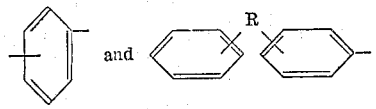

and thereafter deacylating the said polyester.

The diamino-dihydroxy-diphenyl compound used in this invention is characterised in that amino radicals are protected by acyl radicals. Preferable acyl radicals are those in which the said R' radical represents an aliphatic hydrocarbon radical having less than 6 carbon atoms.

Because of the difficulty of preparing the bis-O-aminophenols, R is preferably a direct carbon-to-carbon bond. This carbon-to-carbon bond is preferably para to the amino radical or to the hydroxy radical. Typical examples of such diamino-dihydroxy-diphenyl compounds are 3,3'-dihydroxy-4,4'-diacetamidodiphenyl,
3,3'-diacetamido-4,4'-dihydroxydiphenyl,
bis(3-acetamido-4-hydroxyphenyl)methane,
2,2-bis(3-acetamido-4-hydroxyphenyl)propane,
3,3'-dihydroxy-4,4'-diacetamidodiphenyl ether,
3,3'-dipropionamido-4,4'-dihydroxyphenyl ether,
3,3'-dihydroxy-4,4'-dibenzamidodiphenyl, and
2,2-bis(3-formamido-4-hydroxydiphenyl)propane.

As examples of aromatic dicarboxylic acid compounds to be condensed with the said diamino-dihydroxy-diphenyl compounds, there are terephthalic acid, isophthalic acid, diphenyl dicarboxylic acid, diphenyl ether dicarboxylic acid, diphenyl sulfone dicarboxylic acid, diphenyl methane dicarboxylic acid and diphenyl ethane dicarboxylic acid, and ester-forming derivatives of these compounds such as their acid chlorides, and esters thereof.

A polyester having the said recurring unit, which is an intermediate of this invention, is obtained by polycondensing both components mentioned hereinabove. In this case, more than two kinds of each component may be conjointly used. This reaction is quite easy, and any means used in the ordinary polycondensation reaction can be applied. In particular, however, bulk polymerization, solution polymerization and interfacial polymerization give good results. Though the conditions for the most suitable temperature vary with a respective reaction, these polymerizations are always carried out at a temperature below that at which the radical protecting the amino radical decomposes, that is, at which deacylation takes place. If heating is effected to a temperature beyond this limit, the prepolymer becomes insoluble and infusible and the desired objects cannot be achieved, the polymerization being stopped at a stage where only a low degree of polymerization is attained. Ordinarily, the said diamino-dihydroxy-diphenyl compound is reacted with a substantially equimolar amount of the said aromatic dicarboxylic acid compound.

In a polymerization under heating in which a solvent is not used, the carboxylic acid component is selected from the fusible derivatives and heating is effected to a temperature beyond its melting point. The polymerization may be carried out in a liquid-solid phase or in a homogeneous system. Usually, however, a homogeneous polymerization should preferably be effected in an inert gas.

Accordingly, the reaction temperature of bulk polymerization should be in the range of the melting point of a carboxylic acid component to a temperature at which deacylation takes place, and generally in the range from 100 to 200° C., which range gives good results.

In solution polymerization, a preferable method comprises carrying out a reaction with a gradual increase of temperature while introducing an inert gas such as nitrogen and thereafter separating the solvent; the polymerization temperaure ranges from room temperature to a temperature at which deacylation takes place, preferably from 50 to 200° C.

As a solvent, any substance inert to the starting material is usable. The examples are dimethylformamide, dimethylacetamide, hexamethylphosphamide, dimethylsulphoxide, pyridine, N-methylpyrrolidone, nitrobenzene, dichlorobenzene, chloroform, dichloroethane, trichloroethane, hexane, cyclohexane, cyclohexanone, and tri-(dimethylamino)phosphine oxide. The amount of the solvent used is not particularly limited, but it is suitably less than 20 times the volume of the starting material. In an interfacial polymerization, it is most preferable to employ a process which comprises dissolving a diaminodihydroxyldiphenyl derivative in an aqueous solution containing an inorganic base such as sodium hydroxide, potassium hydroxide, lithium hydroxide, sodium carbonate and sodium bicarbonate or an organic base such as pyridine, piperidine, triethylamine, adding thereto a dicarboxylic acid derivative dissolved in a solvent inert to the starting material and vigorously stirring it.

It is necessary to use a dicarboxylic acid after converting to acid halide. The reaction temperature varies according to other conditions, but a temperature of less than 50° C., particularly in the range of —5–5° C., is preferable. As an alkali, it is especially preferable to use caustic alkalis (NaOH, KOH, LiOH). These may be used in a catalytic amount, but as they have an action of catching the resulting acids, it is preferable to use them in more than a theoretical quantity. Preferable solvents for aromatic dicarboxylic acid compounds are halogenated hydrocarbons such as chloroform, sym-tetrachloroethane and chlorobenzene and ketones such as cyclohexanone, cycloheptanone, and carbon disulphide.

In this case, it is possible to preliminarily add to the aqueous solution an emulsifying agent such as sodium lauryl sulfonate.

The obtained soluble and fusible linear polyester having the said recurring unit is thereafter deacylated, followed by a ring closure reaction, to form fully aromatic polybenzoxazoles.

Such conversion of polyester to polybenzoxazole can be achieved by heating the said polyester to a temperature higher than that at which deacylation takes place. The preferable temperature in this treatment is usually in the range of 200 to 500° C., and particularly in the range of 280 to 400° C. The heat treatment can be achieved only by raising the temperature of the polyester polymerization system, but it should preferably be done after making the polyester into powder, fibre, film, etc. The heating should preferably be done at a pressure less than 100 mm. Hg, and if possible at a highly reduced pressure.

This invention will be more clearly understood by referring the attached drawings, in which FIG. 1 shows the weight retentivity (percent) of the polyester, an intermediate, or the polybenzoxazoles of this invention plotted against the heating temperature; FIGS. 2–4 show the infrared spectra of diamino-dihydroxy-diphenyl compound, one of the monomers to be used herein; the polyester prepared therefrom and the polybenzoxazoles, of this invention.

The fully aromatic polybenzoxazoles thus obtained exhibit clearly different properties from those of the polybenzoxazoles having aliphatic linkages. Namely, the latter is a fusible polymer having melting point around 280 to 350° C., to the preparation of which bulk polymerization is applicable. Whereas, the fully aromatic polybenzoxazoles of this invention are infusible and show no fusibility even when heated to a temperature around 1000° C. (of course, decomposition occurs to some degree). Not only do these have high melting point and high thermal stability, but also they exhibit excellent resistance to water and chemicals.

Hereinafter, this invention is further illustrated by the following examples.

Example 1

7.50 g. (0.25 mole) of 3,3'-dihydroxy-4,4'-diacetamidodiphenyl were dissolved in 200 cc. of an ion-exchange water containing 2 g. of sodium hydroxide by stirring and 15 cc. of an aqueous solution of 10% sodium lauryl sulfonate was added thereto. The solution was cooled by ice and while stirring it vigorously, a solution of 5.08 g. of isophthaloyl chloride in 80 cc. of chloroform from which ethanol had been recoved was added all at once, followed by further vigorous stirring for 10 minutes. The reaction product was poured into 1 liter of acetone while stirring and the polymer was removed. It was washed with acetone after washing with water two times and dried at a reduced pressure in a dryer at 87° C. for 24 hours to give white powder in 90% yield. This polymer is fusible by heating and can be melt-spun. Furthermore, it is soluble in dimethylformamide, dimethylacetamide, dimethylsulfoxide, sulphuric acid, etc. and can be shaped into films from solutions in any of the good solvents listed.

The white poly(3,3'-dihydroxy-4,4'-diacetamidodiphenylisophthalic acid ester) thus obtained was put in a reaction flask and heated to a temperature of 250° C. in a nitrogen atmosphere while reducing the pressure gradually. Instantly, acetic acid began to be distilled out, and deposited on a trap cooled by acetone-Dry Ice. The polymer in the reaction flask gradually assumed a yellow color. After being maintained at a temperature of 250° C. and a pressure of 0.3 mm. Hg for 3 hours, the temperature was raised gradually to 450° C.

After cooling, the product was weighed. It was found that the weight was decreased by an amount corresponding to the weight of acetic acid obtained.

FIG. 1 shows weight retentivity on the ordinate measured when the said polyester was heated to a respective temperature at a pressure of 0.3 mm. Hg for 30 minutes, and heating temperature on the abscissa. Deacylation takes place at a steep gradient and polybenzoxazoles are formed at a temperature higher than this.

The inherent viscosity of the polymer measured at 30° C. in 0.5 g. of the polymer in 100 cc. of concentrated sulphuric acid was 0.51.

FIG. 2 is the IR spectrum of a polyester, to be exact, that of poly - (3,3'-dihydroxy-4-4'-diacetamidodiphenyl-isophathalic acid ester).

FIG. 3 is the IR spectrum of a polybenzoxazole, which is poly-2,2'-(m-phenylene)-6,6'-bibenzoxazole.

Figure 1:
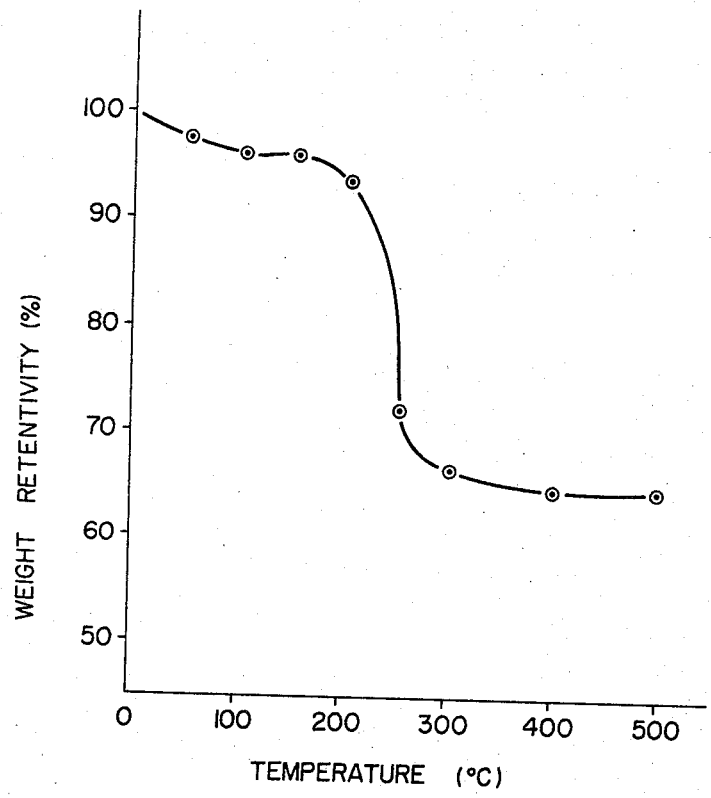
Figure 2:
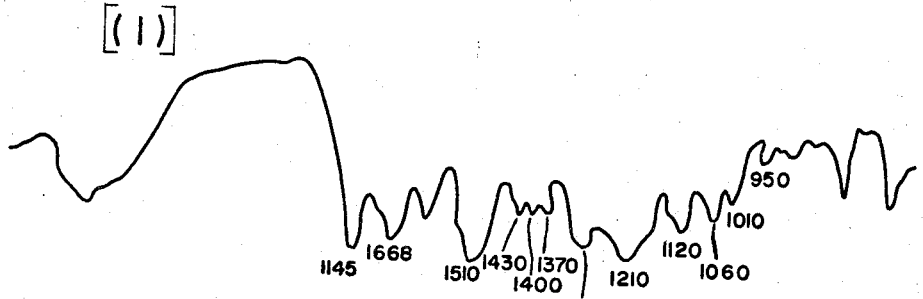
FIGS. 2–4 are IR spectra in accordance with the KBr tableting method.
Figure 3:
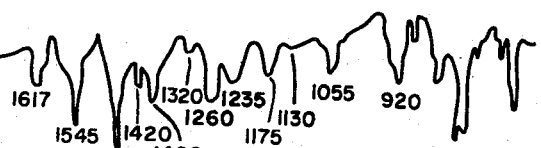
Figure 4:
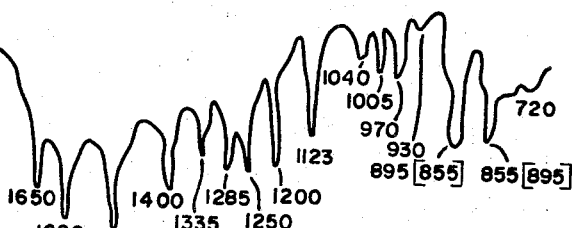

FIG. 4 is the IR spectrum of 3,3'-dihydroxy-4,4'-diacetoamidodiphenyl, respectively. In the spectrum of the polybenzoxazole of this invention, the ester absorption at 1745 cm.$^{-1}$ and the amide absorption at 1668 cm.$^{-1}$ have disappeared and a new C=N absorption at 1617 cm.$^{-1}$ appeared. It corresponds well with the IR of the model compound. The obtained polymer is not melted even when heated to a temperature above 450° C. When a differential thermal analysis was conducted in nitrogen (by means of 10 type differential thermal analysis apparatus manufacturer by Shimazu-DT), no change was observed at a temperature up to 650° C.

Example 2

When 7.50 g. of 3,3'-dihydroxy-4,4'-diacetamidodiphenyl and 5.08 g. of isophthaloyl chloride were heated and melted under a nitrogen stream, vigorous evolution of hydrogen chloride occurred. The melt was cooled, pulverized and heated to a temperature of 200 to 230° C. It was further heated for 3 hours while reducing the pressure gradually to form light orange-colored solid in a yield of 80%.

The resulting product is soluble in the solvent described in Example 1 and can be shaped into films and fibers. The IR determined by the KBr tableting method shows a strong ester absorption at 1745 cm.$^{-1}$. The inherent viscosity determined at 30° C. in 0.5% concentration of dimethylsulfoxide 0.42.

The fibre of the thus obtained poly(4,4'-diacetamido-3,3'-dihydroxydiphenylisophthalic acid ester) was heated for 2 days in a vapor of diphenylmethane having a boiling point of 265° C. The IR spectrum was almost similar with that obtained in Example 1. The same results can be obtained when it was heated in a vapor of diphenylmethane diphenyl ether mixture.

Example 3

Equimolar amounts of 3,3'-dihydroxy-4,4'-diacetamidodiphenyl and diphenyl isophthalate were heated for 1 hour to a temperature of 240° C. Subsequently, it was heated for 30 minutes at 350° C. under a reduced pressure to give a yellow solid. It was found from the IR spectra that it is a substance having mainly polyoxazole configuration. The inherent viscosity was 0.71.

Example 4

An equimolar mixture of 3,3'-dihydroxy-4,4'-dibenzoylamidodiphenyl and isophthaloyl chloride was reacted in the same manner as in Example 2 to give a light orange-colored polymer in a yield of 80%. The polymer is soluble in dimethylformamide, dimethylacetamide and sulphuric acid. This polymer was pulverized and heated for 30 minutes at 350° C. at a reduced pressure below 10 mm. Hg. to give fully aromatic polybenzoxazole having an inherent viscosity of 1.05 and completely infusible even when heated to a temperature of 500° C.

Example 5

Equimolar amounts of 3,3'-diacetamido-4,4'-dihydroxydiphenyl and terephthaloyl chloride were reacted in the same manner as in Example 2 to form a light red polyester. The IR has a strong and wide absorption around 1740–1750 cm.$^{-1}$. The polyester is soluble in concentrated sulphuric acid. When this polyester was heated in a manner described in Example 1, a fully aromatic polybenzoxazole having an inherent viscosity of 0.60 was obtained.

Example 6

Equimolar amounts of 3,3'-dihydroxy-4,4'-diacetamidodiphenyl and diacetoxyisophthalate were heated and melted to form a brown polyester, the acetic acid being distilled off. The structure was identified by IR spectra. This polyester was further heated for 30 minutes at a temperature of 350° C. under a reduced pressure to give a completely unchangeable polymer having an inherent viscosity of 0.60.

Example 7

An equimolar mixture of 3,3'-dihydroxy-4,4'-diacetamidodiphenyl and 2,6-naphthalenedicarbonyl chloride was reacted in the same manner as in Example 2 to form an orange-colored polyester in a yield of 75%. The polyester was further heated in the same manner as in Example 2 to give a polymer having an inherent viscosity of 0.79. This polymer was orange-colored and completely unchangeable even when heated to a temperature above 450° C.

Example 8

8.55 g. (0.025 mole) of 2,2-bis(3-acetamido-4-hydroxyphenyl)propane were dissolved in 200 ml. of nitrogen-saturated ion-exhange water containing 2 g. of lithium hydroxide in a nitrogen current by stirring. The solution was cooled with ice and while stirring vigorously, a solution of 5.08 g. of isophthaloyl chloride in 100 ml. of cyclohexanone was added thereto all at once, followed by vigorous stirring which lasted for 10 minutes. The reaction product was poured in 1 liter of methanol while stirring and the polymer was isolated. The polymer was washed with acetone after being washed with water two times and dried in an oven at 87° C. at a reduced pressure for 24 hours to give white powder in almost quantitative yield. This polymer is fusible upon heating, and is soluble in dimethylformamide, dimethylacetamide, dimethylsulfoxide, formic acid, meta-cresol, sulphuric acid, etc. Films can be shaped from a solution of the polymer in dimethylsulfoxide, for instance.

The thus obtained white poly[2,2-bis(3-acetamido-4-hydroxyphenyl)propane-isophthalic acid ester] was put in a reaction flask and heated to a temperature of 250° C. in a nitrogen atmosphere while reducing the pressure gradually. Soon, acetic acid begain to be distilled out and disposited in a trap cooled with acetone-Dry Ice. The polymer in the reaction flask gradually took on a yellow color. After maintaining it for 3 hours at a temperature of 250° C. and a pressure of 0.3 mm. Hg, the temperature was raised gradually. The polymer was unchangeable even when heated to a temperature of 300° C.

After cooling, the polymer was weighed and it was found that the weight was decreased by the calculated amount of acetic acid formed. The obtained polymer was soluble in a concentrated sulphuric acid. It has an inherent viscosity of 0.71 and is infusible even when heated to a temperature above 450° C.

Example 9

6.84 g. of 2,2-bis(3-acetamino-4-hydroxyphenyl) propane were dissolved in 100 ml. of nitrogen-saturated distilled water containing an equimolar amount of sodium hydroxide in a nitrogen current. To the rapidly stirred system were added all at once, 4.06 g. of isophthaloyl chloride in 100 ml. of cyclohexanone. The polymerization mixture was stirred for 20 minutes, then poured into water. The cyclohexanone boiled away on the steam bath at reduced pressure, and the polymer was filtered. After being washed with methanol, diluted alkali, and diluted hydrochloric acid, the polymer was thoroughly washed with water, and subsequently by acetone, and was dried. It was soluble in sulphuric acid.

A fibre of the thus obtained poly[2,2-bis(3-acetamido-4-hydroxyphenyl)propane-isophthalic acid ester] was heated for 2 days in a vapor of diphenylmethane having a boiling point of 265° C. The obtained polymer was almost the same as that obtained by the procedure of Example 8. The same result was obtained when it was heated in a vapor of a mixture of diphenylmethane and diphenylether.

Example 10

3,3'-diacetamido-4,4'-dihydroxydiphenyl ether was dissolved in anhydrous dimethylacetamide and 1.5× the equivalent of triethylamine was added thereto. A solution of isophthaloyl chloride in cyclohexanone or dimethylacetamide was added thereto with vigorous stirring while cooling it with ice. The continuous stirring made the solution viscous. At a point where no further rise in viscosity was observed, the solution was poured in methanol-water (50:50 by volume) and the polymer was separated. There was obtained white flaky polymer. It is soluble in dimethylsulfoxide, dimethylformamide, dimethylacetamide, etc. Films can be shaped from this solution.

Next, the film obtained from a dimethylformamide solution was heated for 1 hour at a reduced pressure below 10 mm. Hg to a temperature of 300° C. to give light brown films unchangeable at 400° C. The inherent viscosity of this polymer was 0.85.

Example 11

When a mixture of 8.55 g. of 2,2-bis(3-hydroxy-4-acetamidodiphenyl)propane and 5.08 g. of isophthaloyl chloride was heated and melted under a nitrogen current, hydrogen chloride was vigorously evolved. The product was then cooled, pulverized and was heated to a temperature of 200 to 230° C. It was further heated for 3 hours while reducing the pressure gradually to form a light orange-colored solid.

It is soluble in the solvents described in Example 1 and can be shaped into films and fibre.

A powder of this polymer was heated for 1 hour at a reduced pressure below 10 mm. Hg to a temperature of 300 to 360° C. to give a polymer having an inherent viscosity of 0.44 and a decomposition temperature of about 400° C.

Example 12

An equimolar mixture of 3,3'-diacetamido-4,4'-dihydroxyphenyl ether and isophthaloyl chloride was reacted in the same manner as in Example 9 to give light orange-colored polymer in a yield of 97%. This polymer is soluble in dimethylformamide, dimethylacetamide and sulphuric acid.

When this polymer was heat-treated in the same manner as in Example 11, a polymer having an inherent viscosity of 0.56 and a decomposition point of more than 400° C. was obtained.

Example 13

0.02 mole of 2,2-bis(3-acetamido-4-hydroxyphenyl)propane was reacted with a mixture of 0.01 mole of isophthalic acid chloride and 0.01 mole of terephthalic acid chloride in the same manner as in Example 11 to give a light orange-colored polymer in a yield of 94%. When this polymer was heat-treated in the same manner as in Example 11, a polymer having an inherent viscosity of 0.80 and a decomposition point of more than 400° C. was obtained.

Example 14

An equimolar amount of 4,4'-dibutyramino-3,3'-dioxydiphenylmethane and an anhydrous mixture of isophthalic acid and acetic acid was heated and melted to give a brown polyester in a yield of 80%, the acetic acid being distilled off. When this polyester was heat-treated in the same manner as in Example 11, a polymer having an inherent viscosity of 0.85 and a decomposition point of more than 400° C. was obtained.

Example 15

An equimolar mixture of 3,3'-diacetamino-4,4'-dioxydiphenylmethane and 2,6-naphthalene dicarboxylic acid chloride was reacted in the same manner as in Example 11 to form an orange-colored polymer. When this polymer was heat-treated in the same manner as in Example 11, a polymer having an inherent viscosity of 0.60 and a decomposition point of more than 400° C. was obtained.

Example 16

An equimolar mixture of 3,3'-dihydroxy-4,4'-diacetamidodiphenyl and diphenyl methane-p,p'-carbonyl chloride

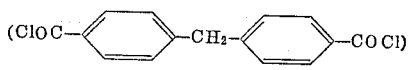

was reacted by interfacial polycondensation for about 20 minutes at room temperature in $H_2O-CS_2$ system containing an equimolar amount of caustic soda to form polyester in almost quantitative yield. This polyester was pulverized and heated for 1 hour at a reduced pressure below 10 mm. Hg to a temperature of 280 to 350° C. There was obtained a solid polymer having an inherent viscosity of 0.81 and decomposition point of above 400° C.

Example 17

An equimolar mixture of 3,3'-dihydroxy-4,4'-diacetamidodiphenyl and diphenyl ether-p,p'-carbonyl chloride

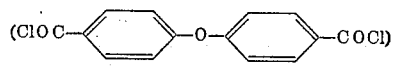

was reacted by interfacial polycondensation for about 20 minutes at room temperature in the presence of a water-cyclohexanone system containing caustic soda to give polyester in almost quantitative yield. When this polymer was heated to a temperature of 300 to 350° C. in the same manner as in Example 16, there was obtained a polymer having an inherent viscosity of 1.00 and a decomposition point above 400° C.

Example 18

An equimolar mixture of 2,2-bis(3-formamido-4-hydroxydiphenyl)propane and sym-diphenyl ethane-p,p'-carbonyl chloride

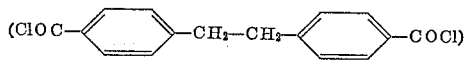

was heated for about 1 hour to a temperature of 100° C. in dimethylacetamide to form a polyester in a yield of about 90%. When this polyester was heated to a temperature of 300 to 360° C. in the same manner as in Example 16, there was obtained a polymer having an inherent viscosity or 0.72 and a decomposition point of more than 400° C.

Example 19

An equimolar mixture of 2,2-bis(3-acetamido-4-hydroxyphenyl)propane and biphenyl-p,p'-carbonyl chloride

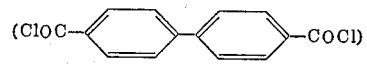

was heated for about 30 minutes to a temperature around 250° C. to form a polyester in a yield of 75%. When this polyester was heated to a temperature of 300 to 360° C. in the same manner as in Example 16, there was obtained a polymer having an inherent viscosity of 0.45 and a decomposition point of more than 400° C.

Example 20

An equimolar mixture of 3,3'-diacetamido-4,4'-dihydroxyphenyl ether and diphenylsulfone-p,p'-carbonyl chloride

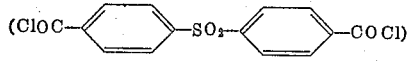

was heated for about 30 minutes to a temperature around 240° C. to form a polyester in a yield of 80%. When this polyester was heated to a temperature of 260 to 300° C., there was obtained a polymer having an inherent viscosity of 0.92 and a decomposition point of more than 400° C.

Example 21

An equimolar mixture of 3,3'-dipropionamido-4,4'-dihydroxyphenyl ether and p,p'-bis(phenoxycarbonyl) diphenylsulone

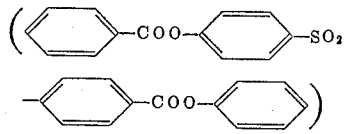

was heated for about 30 minutes to a temperature around 240° C. to form a polyester in a yield of 80%. When this polyester was heated to a temperature of 300 to 360° C. in the same manner as in Example 16, there was obtained a polymer having an inherent viscosity of 0.46 and a decomposition point of more than 400° C.

What we claim is:

1. A process for preparing aromatic polybenzoxazoles which comprises reacting (a) a diamino-dihydroxy-diphenyl compound of the formula:

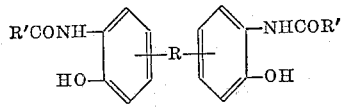

wherein R' is a monovalent radical selected from the group consisting of hydrogen atom, alkyl radical, aryl radical, and arylalkyl radical, R is a direct carbon-to-carbon bond between the two aromatic rings, a divalent hydrocarbon radical having 1 to 3 carbon atoms and —O— radical with (b) an aromatic dicarboxylic acid compound selected from the group consisting of the compounds of the formulae:

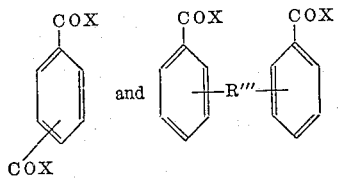

wherein X is selected from the group consisting of hydroxyl radical —OR'' radical and —OCOR''' radical, wherein R'' represents a monovalent radical selected from the group consisting of aliphatic and aromatic hydrocarbon radicals, an amino radical and halogen atom, and R''' is a direct carbon-to-carbon bond between the two aromatic rings, a divalent hydrocarbon radical having 1–3 carbon atoms

radical or —O— radical in an inert atmosphere at a temperature below that at which deacylation occurs to form a polyester having a recurring unit of the formula:

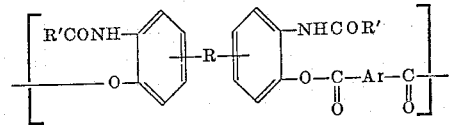

wherein —Ar— is a divalent aromatic radical selected from the group consisting of

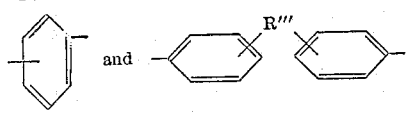

wherein R, R' and R''' are as defined above and thereafter deacylating said polyester by heating same at a temperature at 200°–500° C.

2. The process as claimed in claim 1 wherein the diamino-dihydroxy-diphenyl compound is reacted with the aromatic dicarboxylic acid compound in substantially equimolar amounts.

3. The process as claimed in claim 1 wherein R' is a monovalent aliphatic hydrocarbon radical having less than 6 carbon atoms.

4. The process as claimed in claim 1 wherein the reaction between the diamino-dihydroxy-diphenyl compound and the aromatic dicarboxylic acid compound is an interface polymerization conducted at a temperature below 50° C., said aromatic dicarboylic acid compound being an acid halide; said reaction being effected in the presence of a solvent selected from the group consisting of cyclohexanone, cyclopentanone, carbon disulphide and a hydrocarbon halide; and a compound selected from the group consisting of sodium hydroxide, potassium hydroxide and lithium hydroxide.

5. The process as claimed in claim 4 wherein the temperature is in the range of —5 to 15° C.

6. The process as described in claim 1 wherein the reaction between the diamino-dihydroxy-diphenyl compound and the aromatic dicarboxylic acid compound is a solution polymerization conducted at a temperature from room temperature to a temperature at which deacylation occurs, said reaction being effected in the presence of a solvent selected from the group consisting of dimethylformamide, dimethylsulfoxide, N-methylpyrrolidone, furan, tri(dimethylamino)phosphine oxide, dimethylacetamide and nitrobenzene.

7. The process as claimed in claim 6 wherein the temperature is in the range of 50 to 200° C.

8. The process as claimed in claim 1 wherein the diamino-dihydroxy-diphenyl compound is bulk polymerized at a temperature of 100 to 200° C.

9. The process as claimed in claim 1 wherein deacylation of the polyester is effected at a temperature of 280 to 400° C.

10. The process as claimed in claim 1 wherein deacylation of the polyester is effected at a pressure less than 100 mm. Hg.

11. The process as claimed in claim 1 comprising shaping the polyester into articles of predetermined shape before deacylating same.

12. A polyester which consists of recurring units of the following formula:

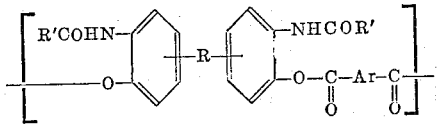

wherein —Ar— is a divalent aromatic radical selected from the group consisting of

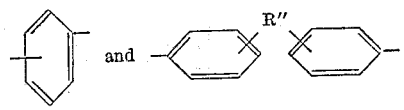

R' is a monovalent radical selected from the group consisting of hydrogen, alkyl, aryl and arylalkyl radicals, R is a direct carbon-to-carbon bond between the two aromatic rings, a divalent hydrocarbon radical having 1 to 3 carbon atoms or —O— radical, and R'' is a direct carbon-to-carbon bond between the two aromatic rings, a divalent hydrocarbon radical having 1 to 3 carbon atoms,

radical or —O— radical.

13. The process as claimed in claim 9 wherein deacylation of the polyester is effected at pressure less than 100 mm. Hg.

References Cited

UNITED STATES PATENTS 3,230,196 1/1966 Moyer _____ 260—47
3,306,876 2/1967 Kantor et al. _____ 260—47

WILLIAM H. SHORT, *Primary Examiner.*

L. LEE, *Assistant Examiner.*